United States Patent [19]

Shinohara

[11] Patent Number: 5,138,414
[45] Date of Patent: Aug. 11, 1992

[54] PRESSURE SENSITIVE SEMICONDUCTOR DEVICE WITH CANTILEVERS

[75] Inventor: Toshiro Shinohara, Kanagawa, Japan

[73] Assignee: Nissan Motor Company, Ltd., Japan

[21] Appl. No.: 739,270

[22] Filed: Aug. 1, 1991

[30] Foreign Application Priority Data

Aug. 3, 1990 [JP] Japan .................. 2-205072

[51] Int. Cl.$^5$ ............................................. H01L 29/84
[52] U.S. Cl. ......................................... 357/26; 357/25; 357/55; 357/51; 357/28; 73/517 R; 73/777; 338/5; 361/283; 280/735
[58] Field of Search ............... 357/26, 25, 28, 55; 73/517 R, 517 A, 777, 760, 768; 361/280, 283; 338/5, 2, 46; 280/735

[56] References Cited

U.S. PATENT DOCUMENTS

| 4,836,025 | 6/1989 | Mihara | 73/517 R |
| 4,869,107 | 9/1989 | Murakami | 73/517 R |
| 4,920,801 | 5/1990 | Church | 73/517 R |
| 4,969,359 | 11/1990 | Mikkor | 73/517 R |
| 4,987,781 | 1/1991 | Reimann | 73/517 R |

FOREIGN PATENT DOCUMENTS

| 3928935 | 8/1989 | Fed. Rep. of Germany . | |
| 60-100474 | 6/1985 | Japan | 357/26 |
| 62-213280 | 9/1987 | Japan . | |
| 63-41079 | 2/1988 | Japan | 357/26 |
| 63-81274 | 4/1988 | Japan . | |
| 2-218171 | 8/1990 | Japan | 357/26 |

*Primary Examiner*—William Mintel
*Attorney, Agent, or Firm*—Lowe, Price, LeBlanc & Becker

[57] ABSTRACT

A semiconductor device comprises a semiconductor base having an aperture to form a first cantilever having a weight integral therewith, a second cantilever and a third cantilever. The second and third cantilevers are formed on the opposite sides of the first cantilever. The semiconductor device also comprises first and second piezo resistors formed in the first cantilevers, a third piezo resistor formed in the second cantilever, and a fourth piezo resistor formed in the third cantilever. The first, second, third and fourth piezo resistors are connected in a four-arm bridge circuit having a first pair of opposite arms comprised of the first and second piezo resistors, respectively, and a second pair of opposite arms comprised of the third and fourth piezo resistors, respectively, to compensate the first and second piezo resistors for temperature.

3 Claims, 6 Drawing Sheets

PRESSURE SENSITIVE SEMICONDUCTOR DEVICE WITH CANTILEVERS

BACKGROUND OF THE INVENTION

This invention relates to a semiconductor device applicable to a pressure sensor, an accelerometer or the like having a temperature compensating function.

For example, Japanese Patent Kokai No. 62-213280 discloses a semiconductor accelerometer having a temperature compensation function. The semiconductor accelerometer includes a silicon substrate having an aperture to form an accelerometer cantilever having a weight integral therewith, and a temperature compensating cantilever located on one side of the accelerometer cantilever. First and second piezo resistors are formed in the accelerometer cantilever adjacent its root for detecting the degree of deflection of the accelerometer cantilever. Third and fourth piezo resistors are formed in the temperature compensating cantilever adjacent its root. The four piezo resistors, which have resistances dependent upon temperature, are connected in a bridge circuit having a first pair of opposite arms comprised of the first and second piezo resistors, respectively, and a second pair of opposite arms comprised of the third and fourth piezo resistors, respectively, so that the second and fourth piezo resistors can provide temperature compensation for the first and second piezo resistors to provide accurate acceleration measurements over a wide temperature range.

One difficulty associated with the conventional semiconductor accelerometer is that the third and fourth piezo resistors have resistances deviated from those of the first and second piezo resistors to cancel the temperature compensating effect. The resistances of the piezo resistors are determined by the resistance distribution in a semiconductor wafer from which the sensor chip is cut. The cantilevers are required to have a width of several hundreds of $\mu$m and to be spaced at a distance of several tens of $\mu$m from each other. For this reason, the distance between the piezo resistors provided on the two cantilevers is as far as several hundreds of $\mu$m. This distance is sufficient to differ the resistances of the third and fourth piezo resistors from those of the first and second piezo resistors.

SUMMARY OF THE INVENTION

Therefore, a main object of the invention is to provide an improved semiconductor device which can assure accurate temperature compensation over a wide temperature range.

There is provided, in accordance with the invention, a semiconductor device comprising a semiconductor base having an aperture to form a first cantilever having a weight integral therewith, a second cantilever and a third cantilever. The second and third cantilevers are formed on the opposite sides of the first cantilever. The semiconductor device also comprises first and second piezo resistors formed in the first cantilevers, a third piezo resistor formed in the second cantilever, and a fourth piezo resistor formed in the third cantilever. The first, second, third and fourth piezo resistors are connected in a four-arm bridge circuit having a first pair of opposite arms comprised of the first and second piezo resistors, respectively, and a second pair of opposite arms comprised of the third and fourth piezo resistors, respectively, to compensate the first and second piezo resistors for temperature.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
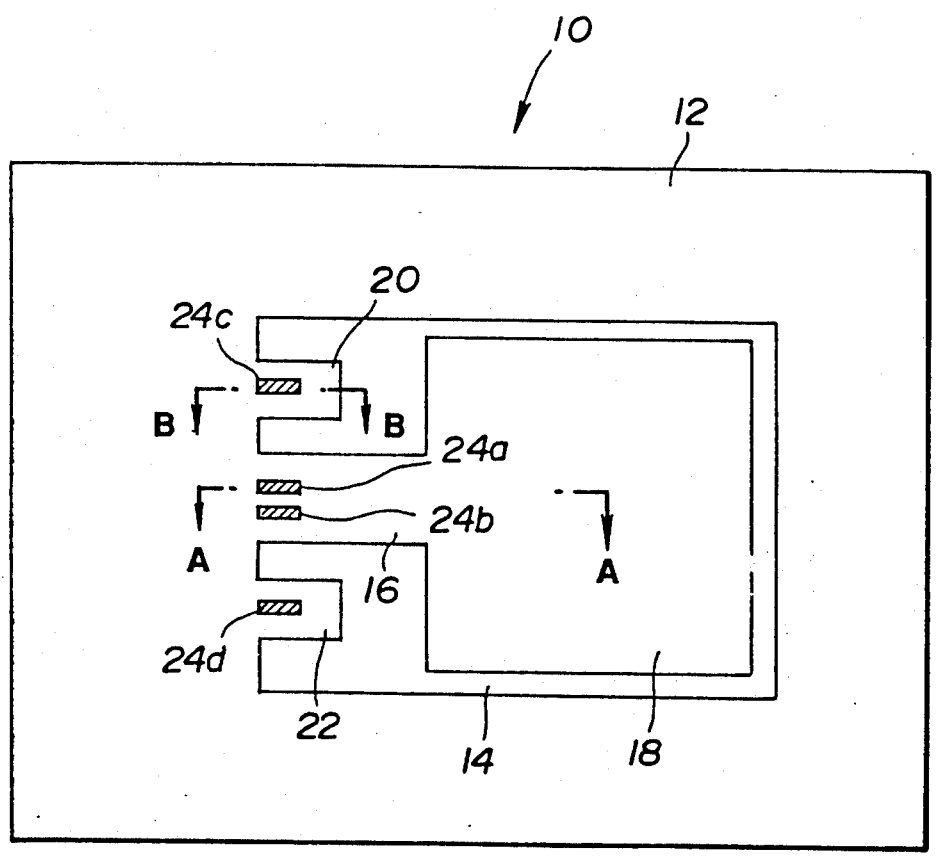
FIG. 1 is a plan view showing one embodiment of a semiconductor device made in accordance with the invention.

With reference to the drawings, wherein like numerals refer to like parts in the several views, and in particular to FIG. 1, there is shown a semiconductor device embodying the invention. The semiconductor device, generally designated by the numeral 10, includes a semiconductor base 12 having an aperture 14 to form an accelerometer cantilever 16 having a weight 18 integral therewith, and a pair of temperature compensation cantilevers 20 and 22 located on the opposite sides of the accelerometer cantilever 16. The accelerometer cantilever 16 has first and second piezo resistors 24a and 24b formed therein at a position adjacent to its root. The temperature compensation cantilever 20 has a third piezo resistor 24c formed therein at a position adjacent to its root. The temperature compensation cantilever 22 has a fourth piezo resistor 24d formed therein at a position adjacent to its root.

Figure 2A:
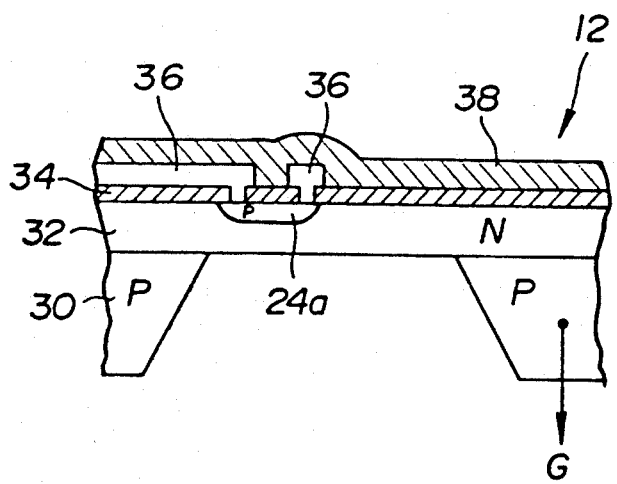
FIG. 2A is a fragmentary sectional view taken along the lines A—A of FIG. 1.
Figure 2B:
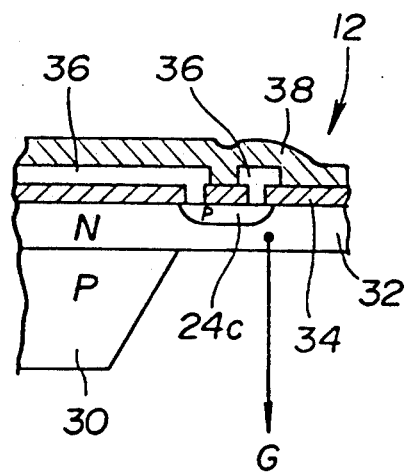
FIG. 2B is a fragmentary sectional view taken along the lines B—B of FIG. 1.

Referring to FIGS. 2A and 2B, the semiconductor base 12 includes a p-type silicon substrate 30 having an n-type epitaxial layer 32 formed thereon. The epitaxial layer 32 has the piezo resistors 24a, 24b, 24c and 24d formed therein near its upper surface. An insulating layer 34 covers the upper surface of the epitaxial layer 32 except for electrodes 36 connected to the piezo resistors. The electrodes 36 are covered, along with the insulating layer 34, by a protective layer 38.

Figure 3:
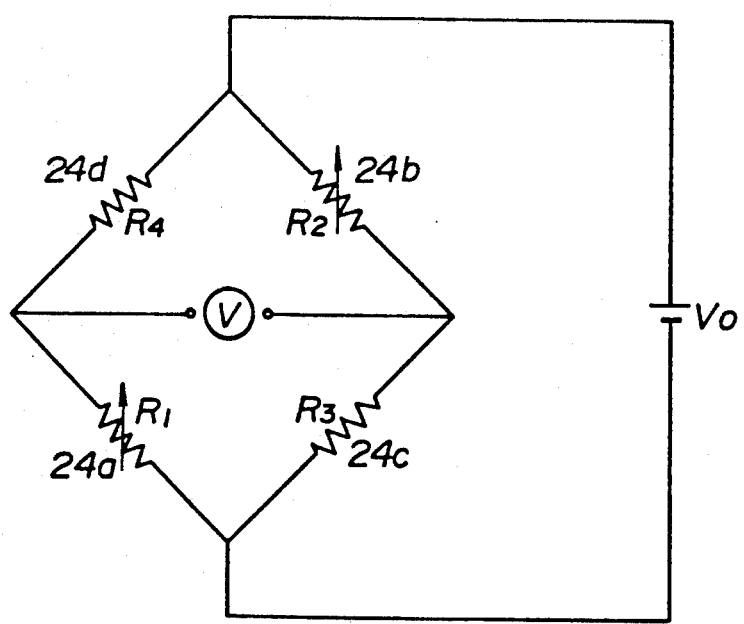
FIG. 3 is a circuit diagram showing one example of connection of the piezo resistors used in the semiconductor device of FIG. 1.

Referring to FIG. 3, the piezo resistors 24a, 24b, 24c and 34d are connected in a four-arm bridge circuit having a first pair of opposite arms comprised of the first and second piezo resistors 24a and 24b, respectively, and a second pair of opposite arms comprised of the third and fourth piezo resistors 24c and 24d. The piezo resistors 24a, 24b, 24c and 24d are shown as having respective resistances $R_1$, $R_2$, $R_3$ and $R_4$.

Figure 4:
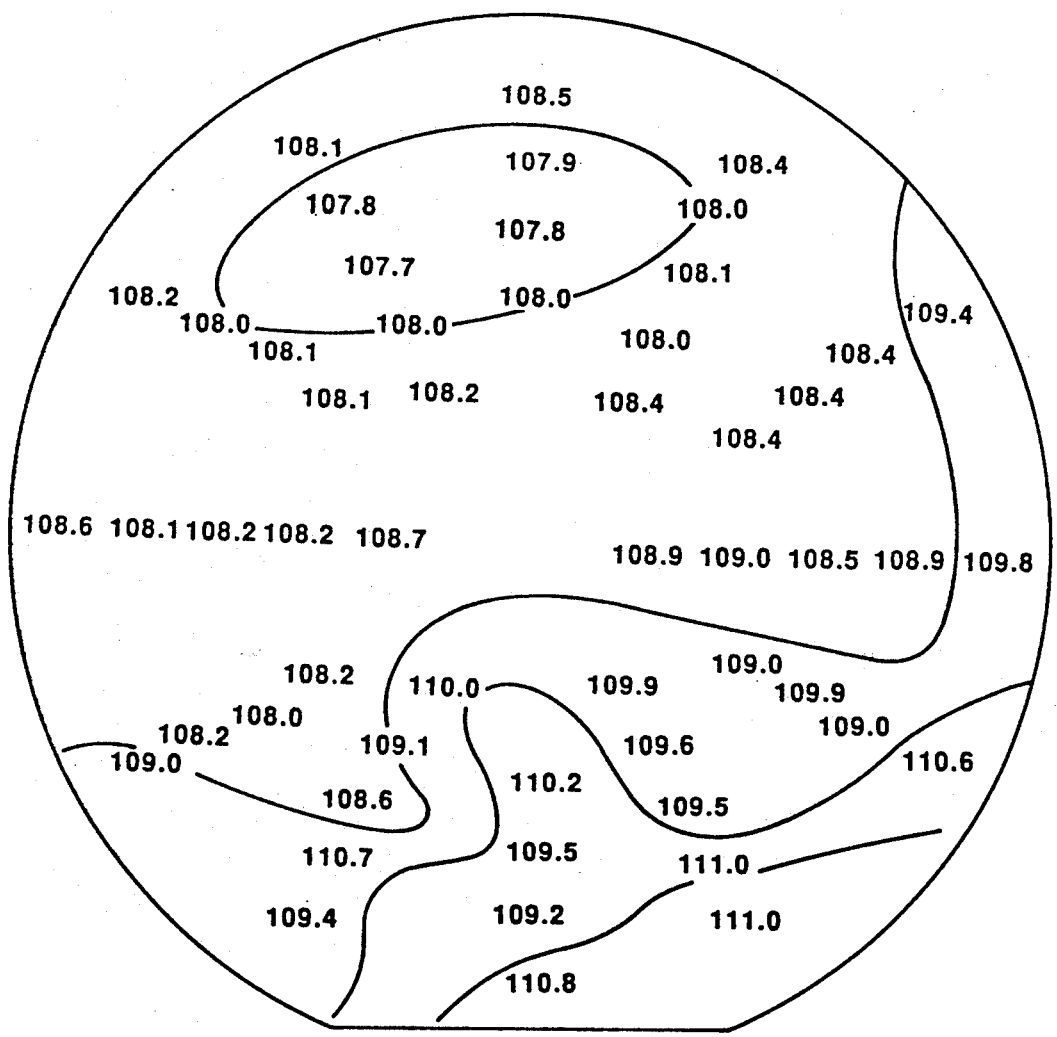
FIG. 4 is a distribution chart showing a pattern of distribution of piezo resistances in a semiconductor wafer.
Figure 5:
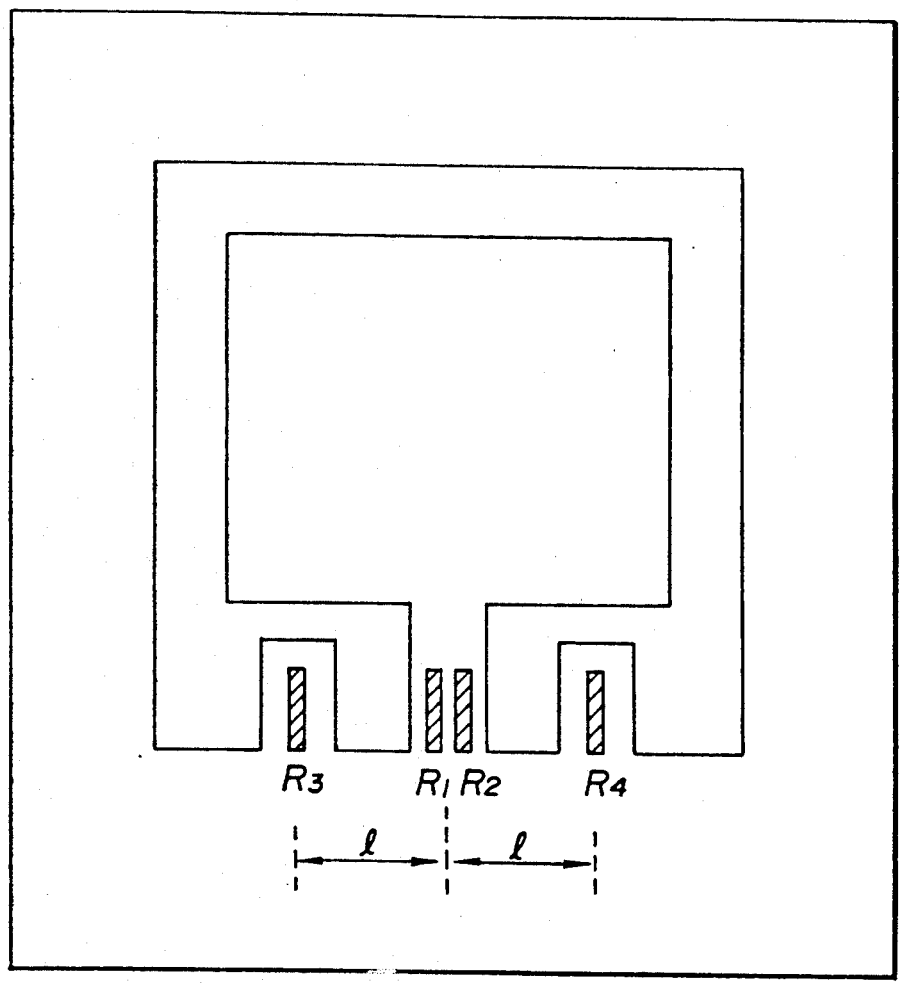
FIG. 5 is a graph showing a linear relationship between piezo resistance and distance.
Figure 5:
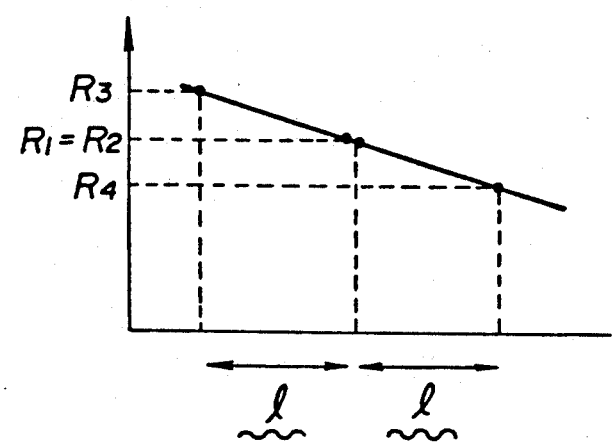

The operation is as follows:

Piezo resistances are distributed in a semiconductor wafer having a number of (for example, 100) sensor chips formed thereon. FIG. 4 shows a piezo resistance distribution pattern when the designed piezo resistance is 108 expressed in a desired unit. As can be seen from FIG. 4, piezo resistances are distributed at random with a great winding. It was found, however, the piezo resistance distribution has a certain pattern in a sensor chip cut from the semiconductor wafer. The pattern provides a linear relationship between piezo resistance and distance, as shown in FIG. 5.

Assuming now that $R_{01}$, $R_{02}$, $R_{03}$ and $R_{04}$ are the designated resistances of the respective piezo resistors 24a, 24b, 24c and 24d and $\Delta R_1$, $\Delta R_2$, $\Delta R_3$ and $\Delta R_4$ are the deviations of the actual resistances from the designed resistances of the respective piezo resistors 24a, 24b, 24c and 24d, the respective actual resistances $R_1$, $R_2$, $R_3$ and $R_4$ are given as $$R_1 = R_{01} + \Delta R_1$$
$$R_2 = R_{02} + \Delta R_2 \quad (1)$$
$$R_3 = R_{03} + \Delta R_3$$
$$R_4 = R_{04} + \Delta R_4$$

If the two temperature compensation cantilevers 20 and 22 are symmetric with respect to the accelerometer cantilever 16, the following equation is established:

$$\Delta R_3 - \Delta R_1 = \Delta R_2 - \Delta R_4 \quad (2)$$

Since the piezo resistors 24a and 24b are spaced at a short distance, the following equation is established:

$$\Delta R_1 = \Delta R_2 \quad (3)$$

In the absence of acceleration, the output voltage $\Delta V$ of the bridge circuit of FIG. 3 will be zero if the actual resistances are equal to the respective designed resistances. If the actual resistances are deviated from the respective designed resistances, the output voltage $\Delta V$ is given as $$\Delta V = \frac{\Delta R_3 - \Delta R_1 + \Delta R_4 - \Delta R_2}{R_1 + R_2 + R_3 + R_4} \quad (4)$$

According to the invention, Equation (2) is established. Therefore, the output voltage $\Delta V$ is held at zero, as can be seen from a substitution of Equation (2) into Equation (4). This means that the semiconductor device made in accordance with the invention can provide an accurate temperature compensation regardless of deviations of the actual resistances from the values designed for the piezo resistors.

Figure 6A:
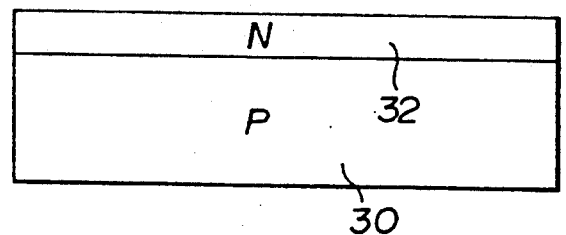
FIGS. 6A through 6G are sectional views used in explaining a process of producing the semiconductor device of FIG. 1.
Figure 6B:
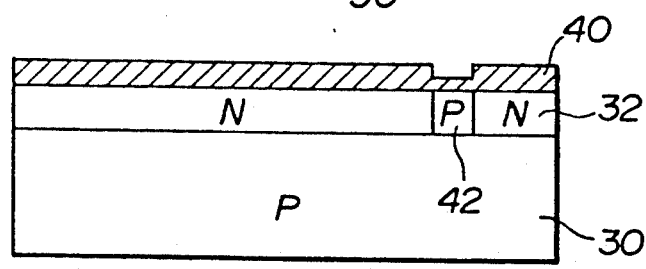
Figure 6C:
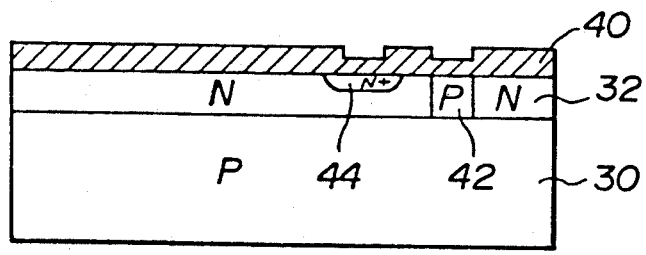

Referring to FIGS. 6A to 6G, description is made to a process of producing the semiconductor device of the invention. First of all, an n-type epitaxial layer 32 is grown on a p-type (100) oriented silicon substrate 30, as shown in FIG. 6A. For example, the silicon substrate 30 has a specific resistance of about 5 $\Omega$·cm and a thickness of about 400 $\mu$m. For example, the epitaxial layer 32 has a specific resistance of 10 $\Omega$·cm and a thickness of about 10 $\mu$m. The thickness of the epitaxial layer 32 is selected in conjunction with the sensor sensitivity. Following this, a thermal oxidation technique is used to form a SiO$_2$ insulating layer 40 is formed on the upper surface of the epitaxial layer 32, as shown in FIG. 6B. The insulating layer 40 serves as a mask for formation of a p-type diffused region 42 in the n-type epitaxial layer 32. The diffused region 42 corresponds to the aperture 14 (FIG. 1). After the formation of the diffused region 42, an n-type diffused region 44 is formed in the epitaxial layer 32 near its upper surface, as shown in FIG. 6C. The diffused region 44 is used to connect the epitaxial layer 32 to an etching electrode to be described later.

Figure 6D:
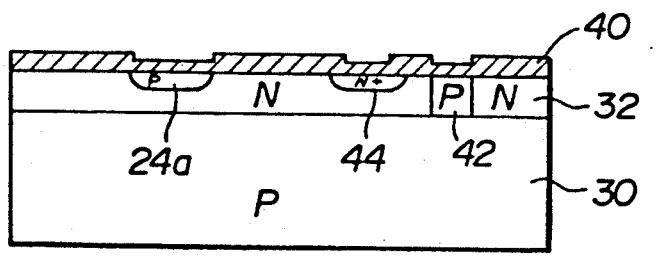

Upon completion of the formation of the diffused region 44, p-type impurities (for example, $1 \times 10^{18}$ cm$^{-3}$) are selectively diffused to form the piezo resistors 24a, 24b, 24c and 24d in the epitaxial layer 32 at predetermined positions, as shown in FIG. 6D. The impurity concentration is selected in an appropriate manner in conjunction with the impurity diffusion control accuracy since impurity concentration variations causes variations in the resistances of the piezo resistors 24a, 24b, 24c and 24d. The sensitivity of each of the piezo resistors 24a, 24b, 24c and 24d increases as the diffused impurity concentration decreases.

Figure 6E:
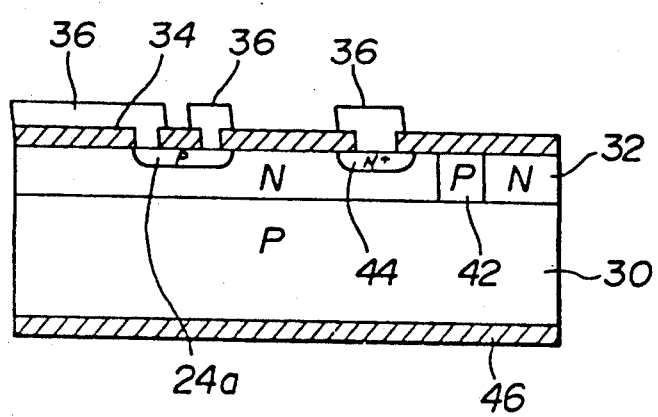
Figure 6F:
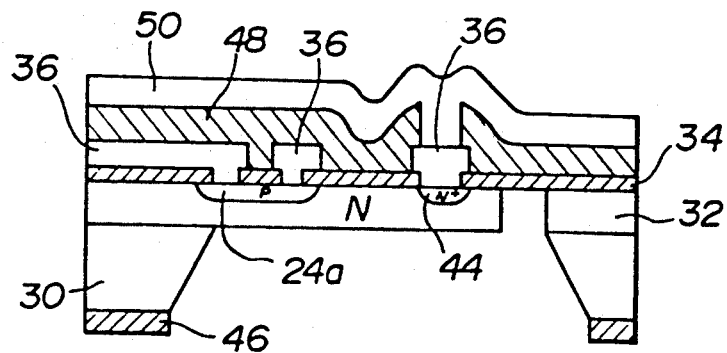
Figure 6G:
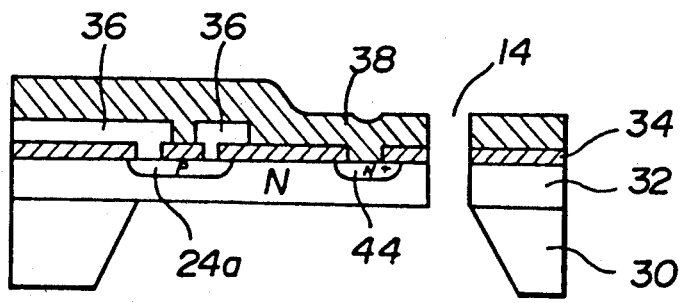

After the SiO$_2$ insulating layer 44 is removed, a SiO$_2$ oxide layer 34 is formed on the upper surface of the epitaxial layer 32 and a SiO$_2$ oxide layer 46 is formed on the lower surface of the silicon substrate 30, as shown in FIG. 6E. For example, the oxide layers 34 and 46 have a thickness of about 1 $\mu$m. Thereafter, electrodes 36 are formed for connection to the N+ diffused region 44 and to the piezo resistors 24a, 24b, 24c and 24d. Following this, an insulating layer 48, which employs PSG having a thickness of about 7000 Å, is formed to cover the oxide layer 34 and the electrodes 36, as shown in FIG. 6F. An electrochemical etching electrode 50 is formed over the insulating layer 48. The etching electrode 50 is connected to the electrode 36 which in turn is connected to the N+ type diffused region 44, as shown in FIG. 6F. The oxide layer 46 formed on the lower surface of the silicon substrate 30 has a portion removed. This removed portion provides an opening used during an electrochemical etching process. After the removal of the portion where the cantilevers 16, 20 and 22 (FIG. 1) are to be formed, an electrochemical etching process is performed for the semiconductor block immersed in an alkaline etching solution such as a KOH solution, a mixture of ethylenediamine, pyrocatechol and water, or the like having an anisotropy for the etching process. A voltage is applied between an anode (etching electrode 50) and a platinum cathode. During the electrochemical etching process, the p-type substrate 30 is removed through the opening to the pn junction between the p-type substrate 30 and the n-type epitaxial layer 32. The p-type region is also removed to form the aperture 14 (FIG. 1). Although the p-type substrate 30 to which no voltage is applied is etched during the electrochemical etching process, etching stops at the pn junction due to an anode oxidation effect. For this reason, it is possible to control the thickness of the cantilevers with high accuracy. Following this, the oxide and insulating layers 34 and 48 are removed above the aperture 14 and then the etching electrode 50 is removed, as shown in FIG. 6G. Thereafter, a protective layer 38, which employs a PSG or the like, is formed again, as shown in FIG. 6G.

Although the invention has been described in connection with an accelerometer having a pair of temperature compensating cantilevers 20 and 22 provided on the opposite sides of an accelerometer cantilever 16, it is to be noted that a plurality of temperature compensating cantilevers may be provided on one side of the accelerometer cantilever when the resistances of the piezo resistors varies in a linear relation to distance as shown in FIG. 5. In this case, an appropriate operational circuit is required to correct the temperature responsive characteristic. Although the invention has been described in connection with an accelerometer having two temperature compensating cantilevers, it is to be noted that two or more temperature compensating cantilevers may be provided on the both or one of the sides of the accelerometer cantilever. Although the invention has been described in connection with an accelerometer, it is to be noted that the invention is applicable to pressure sensors and other semiconductor devices.

What is claimed is:

1. A semiconductor device comprising:

a semiconductor base having an aperture to form a first cantilever having a weight integral therewith, a second cantilever and a third cantilever, the second and third cantilevers being formed on the opposite sides of the first cantilever;

first and second piezo resistors formed in the first cantilever;

a third piezo resistor formed in the second cantilever; and a fourth piezo resistor formed in the third cantilever;

the first, second, third and fourth piezo resistors being connected in a four-arm bridge circuit having a first pair of opposite arms comprised of the first and second piezo resistors, respectively, and a second pair of opposite arms comprised of the third and fourth piezo resistors, respectively, to compensate the first and second piezo resistors for temperature.

2. The semiconductor device as claimed in claim 1, wherein the third and fourth piezo resistors are symmetric with respect to the first cantilever.

3. The semiconductor device as claimed in claim 1, wherein the first cantilever has a longitudinal axis, wherein the first and second piezo resistors are symmetric with respect to the longitudinal axis, and wherein the third and fourth piezo resistors are symmetric with respect to the longitudinal axis.

* * * * *